Patented Nov. 25, 1924.

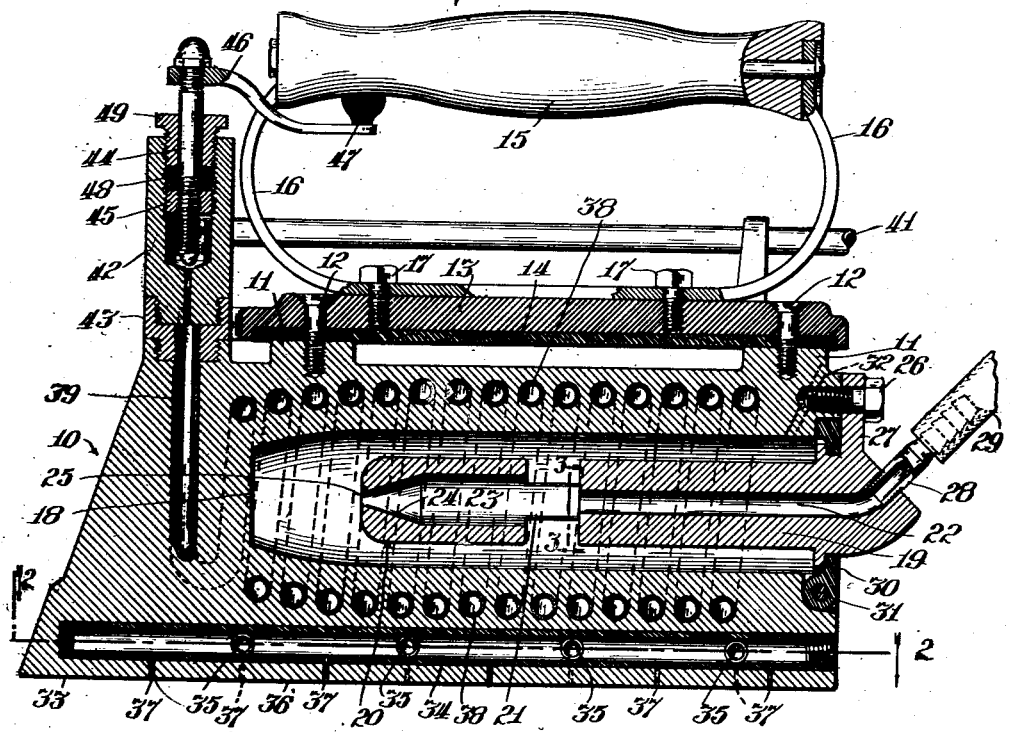

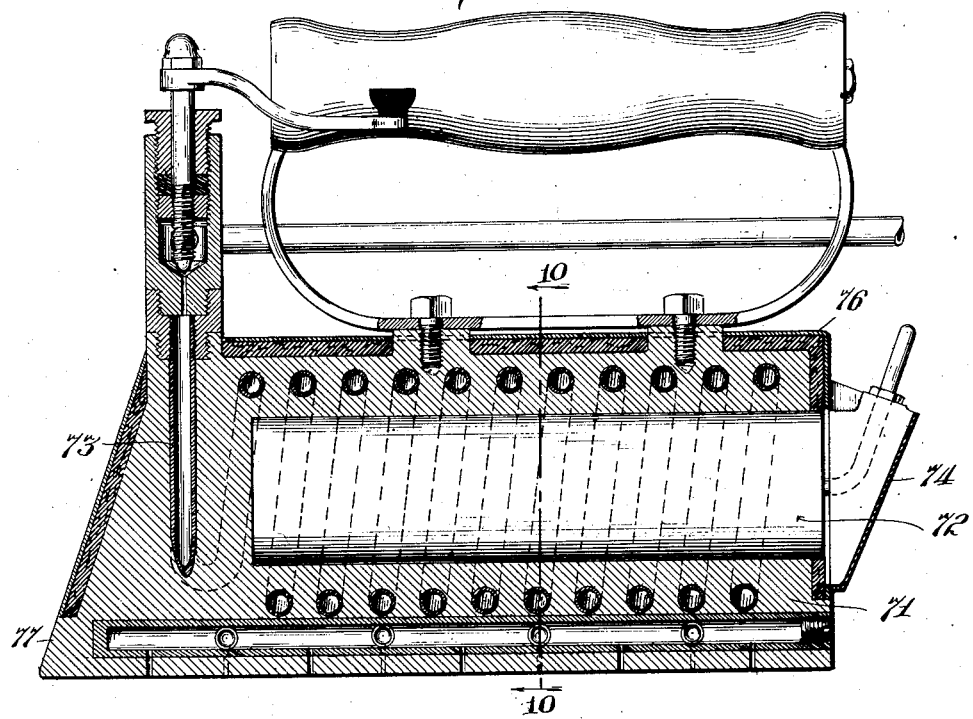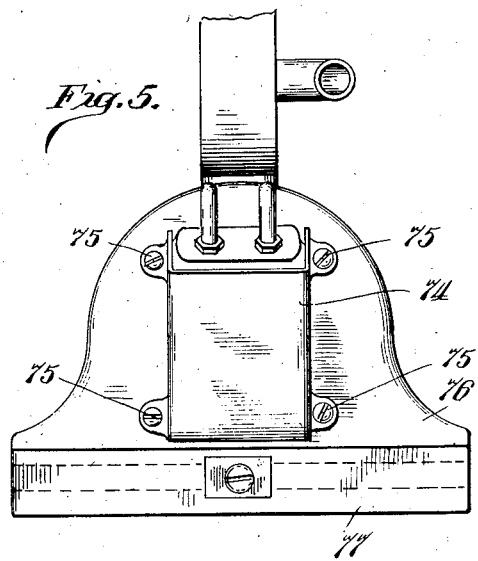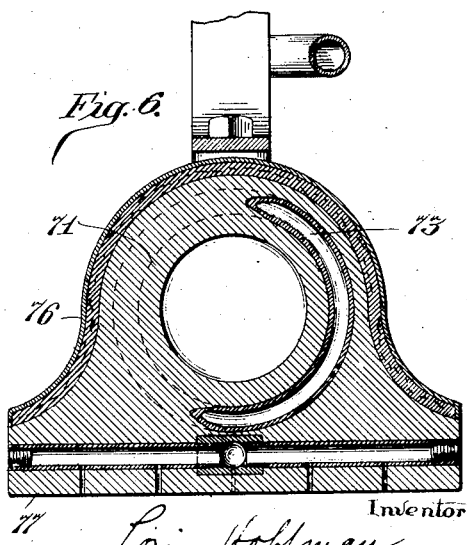

1,516,923

UNITED STATES PATENT OFFICE.

LOUIS HOFFMAN, OF DULUTH, MINNESOTA, ASSIGNOR, BY MESNE ASSIGNMENTS, TO STEAM PRESSING IRON COMPANY, A CORPORATION OF DELAWARE.

PRESSING IMPLEMENT.

Application filed April 24, 1920. Serial No. 376,184.

*To all whom it may concern:*

Be it known that I, LOUIS HOFFMAN, a citizen of the United States, residing at Duluth, in the county of St. Louis and State of Minnesota, have invented certain new and useful Improvements in Pressing Implements, of which the following is a specification.

My invention relates to a flat iron or tailor's goose, of the self heated moistening type; and the principal objects of the invention are: To provide an iron having a duct or ducts in the body of the implement through which the moistening fluid is passed for the purpose of generating into steam, when water is the fluid supplied to the iron, or for superheating the steam, when steam is supplied thereto; and to provide other improvements in the details of construction of implements of this character as will hereinafter appear.

The invention is illustrated in certain preferred embodiments, in the accompanying drawings wherein—

Fig. 1 is a longitudinal sectional view through a gas heated tailor's goose of the moistening type, certain parts of the implement being shown in elevation.

Fig. 2 is a sectional plan on line 2—2 of Fig. 1.

Fig. 3 is a detail sectional view of the burner taken on line 3—3 of Fig. 1.

Fig. 4 is a view, similar to Fig. 1, illustrating an electrically heated flat iron of the moistening type provided with a heat insulating shield above referred to.

Fig. 5 is a fragmentary end elevation of the implement, and

Fig. 6 is a vertical section on line 10—10 of Fig. 4.

Like characters of reference designate like parts in the several figures of the drawings.

Referring first to Figs. 1 and 2, 10 designates the body of the pressing implement which is preferably composed of aluminum alloyed with sufficient copper to make it non-porous. The upper surface of the body 10 is formed with a pair of bosses 11 to which is secured by screws 12 a plate 13, a body of insulating material 14 being preferably interposed between the plate 13 and body 10. The handle 15 of the device is secured to a bent strip 16 fastened by screws 17 to the plate 13. The body is formed with a recess 18 in which is arranged a gas burner consisting of an inlet section 19 and a nozzle section 20 connected but spaced apart by webs 21 and having aligning fuel ducts 22, 23, the latter being tapered at 24 to its discharge outlet 25. The burner is held in place by means of a screw 26 which passes through a lug 27 formed on the inlet end of the burner and engages the body of the pressing implement. The burner is provided with a nipple 28 for a flexible hose 29 which supplies the burner with mixed air and gas. 30 is a door hinged at 31 to the back of the body of the implement which closes the recess in which the burner is located. 32 represents a small port for escape of products of combustion. I have found by experience that a burner so constructed heats the implement very effectively. In the base portion 33 of the body is arranged a tubular member 34 extending lengthwise of the implement to which are preferably fixed transverse tubular members 35. The pressing face 36 of the implement is formed with a plurality of perforations 37 which extend through to the interior of the tubular members 34, 35. Embedded in the body of the iron above the tubular structure 34, 35 is a pipe coil 38, one end of which 39, extends through the top of the body, and the other end, 40, of which is tapped into the tubular member 34. The pipe coil 38 and the tubular structure 34, 35 are preferably made of copper. They provide together the duct for the moistening fluid which (whether introduced into the implement as steam or water) is injected against the goods through perforations 37 in the pressing face, in the form of more or less highly superheated steam. The moistening fluid is supplied to the implement through a pipe 41 which is connected with a valve casing 42 fastened by means of a union 43 to the end 39 of the pipe coil 38. The inflow of moistening fluid is controlled by a valve 44 threaded through a plug 45 fixed in the valve casing and provided with a lever 46 having a thumb piece 47, the valve casing being made tight by a packing 48 held in place by a gland 49.

Some difficulty has been experienced in providing a satisfactory moistening or steaming iron which may be supplied with water. The convenience of using water instead of steam as a fluid supply will be apparent. The use of water, necessitating its generation into steam within the implement, involves certain difficulties. The steam generating duct must be of comparatively small cross sectional area in order that sufficient pressure be created to discharge the steam through the minute perforations in the pressing face, these perforations being, as a matter of fact, exaggerated in size in the drawing. The duct must be of considerable length and so disposed as to be heated to the maximum throughout its length in order that the steam when generated should be not only kept dry but also superheated.

The efficiency of the implement depends upon the capacity of the steam to penetrate the goods. Ordinarily but a small amount of moisture is required. Any excess involves just so much more time and labor in its evaporation, and the higher the temperature of the steam injected into the goods the easier its evaporation will be. It is not a simple matter, however, to form by coring a duct of the proper length and cross sectional area and so disposed that all parts thereof will be directly exposed to the heat from the burner or other device used for heating the implement. If the body of the implement be made of cast iron, as is usual, the cold water, if supplied continuously in considerable quantities, cools the surfaces with which it comes into contact and the generation of steam at the pressure required becomes impossible. These difficulties have been solved by forming the body of the implement of some metal, such as aluminum, which has a relatively high coefficient of thermal conductivity, and by forming the steam generating duct of a tubular structure, also made of a metal having a high coefficient of thermal conductivity, such as copper, which is cast into the body of the implement and consists in the main of a coil which passes in a considerable number of turns around the recess in the body in which the burner or other heating element is located.

In Figs. 4, 5 and 6, I have shown an electrically heated flat iron (which may be manufactured substantially in accordance with the method just described) which is provided with a heat insulating shield that covers practically the entire body of the implement except the base portion thereof. This insulating device might be used in connection with a gas heated implement but it is of particular utility in connection with an electrically heated device because where electricity is used for heating it is important to utilize to the fullest extent all of the heat generated, both for reasons of economy and because it is not an easy matter to obtain an electrical heat unit of the necessary compactness which will give sufficient heat for generating water into steam and keeping the pressing face of the flat iron up to the requisite temperature. In the drawing 71 designates the body of the implement, 72 the electrical heating unit snugly fitting into a recess formed in the body, and 73 the tubular structure which provides the moisture duct. 74 is a cap piece which is fastened to the back of the iron by screws 75 and holds the heating unit in place. 76 is a hood preferably made of metal which covers over substantially all of the body of the flat iron except its base portion 77. Between this hood and the body is arranged insulating material 78, preferably asbestos.

I claim:

1. A pressing implement of the moistening type comprising an integral body of metal formed with a recess for a heating element and provided with a circulation duct for the moistening fluid formed in part of a pipe coil about the several turns of which coil the body of metal is cast with the coil surrounding the recess, the pressing face of the implement having perforations communicating with the duct for the discharge of the moistening fluid from the duct.

2. A pressing implement of the moistening type comprising an integral body of metal formed with a recess for a heating element and having cast therein a pipe coil surrounding said recess, a longitudinal tubular element connected with said pipe coil, and a transverse tubular element connected with the longitudinal tubular element which form together the circulation duct, the pressing face of said implement and portions of said tubular elements having communicating perforations for discharge of the moistening fluid from said duct.

3. A pressing implement of the moistening type comprising a pipe, a plurality of pieces of pipe tapped into the sides of said first-named pipe, a pipe coil above said first-named pipe and communicating therewith, a body of metal cast about said pipes and having a smooth pressing surface at its lower face, and means for causing steam to circulate through said system of piping, said body of metal and said piping having communicating openings for discharge of steam at a plurality of points along the pressing face.

LOUIS HOFFMAN.